(12) United States Patent
Jain et al.

(10) Patent No.: US 11,165,702 B1
(45) Date of Patent: Nov. 2, 2021

(54) COMMUNICATION OF POLICY CHANGES IN LISP-BASED SOFTWARE DEFINED NETWORKS

(71) Applicant: Cisco Technology, Inc., San Jose, CA (US)

(72) Inventors: Prakash C. Jain, Fremont, CA (US); Sanjay Kumar Hooda, Pleasanton, CA (US); Satish Kondalam, Milpitas, CA (US); Raja Janardanan, Milpitas, CA (US); Aaditya Vadnere, Milpitas, CA (US); Shivangi Sharma, Los Gatos, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/864,442

(22) Filed: May 1, 2020

(51) Int. Cl.
| | | |
|---|---|---|
| *H04L 12/28* | (2006.01) | |
| *H04L 12/747* | (2013.01) | |
| *H04L 12/741* | (2013.01) | |
| *H04L 12/801* | (2013.01) | |
| *H04L 12/715* | (2013.01) | |
| *H04L 12/813* | (2013.01) | |
| *H04L 29/06* | (2006.01) | |

(52) U.S. Cl.
CPC ............ *H04L 45/742* (2013.01); *H04L 45/04* (2013.01); *H04L 45/54* (2013.01); *H04L 47/20* (2013.01); *H04L 47/33* (2013.01); *H04L 63/20* (2013.01)

(58) Field of Classification Search
None
See application file for complete search history.

(56) References Cited

U.S. PATENT DOCUMENTS

| | | | |
|---|---|---|---|
| 10,015,132 B1* | 7/2018 | Qin ..................... | H04L 61/2592 |
| 10,904,201 B1* | 1/2021 | Ermagan ............... | H04L 61/106 |
| 2012/0173694 A1* | 7/2012 | Yan ........................ | H04L 61/103 709/223 |
| 2017/0026417 A1* | 1/2017 | Ermagan ............. | H04L 63/0272 |
| 2017/0054692 A1* | 2/2017 | Weis .................... | H04L 12/4633 |

(Continued)

OTHER PUBLICATIONS

Fuller et al., Locator/ID Separation Protocol (LISP) Map-Server Interface, IETF, RFC6833, pp. 1-13. (Year: 2013).*

(Continued)

*Primary Examiner* — Elisabeth Benoit Magloire
(74) *Attorney, Agent, or Firm* — Polsinelli

(57) ABSTRACT

Systems, methods, and computer-readable media for communicating policy changes in a Locator/ID Separation Protocol (LISP) based network deployment include receiving, at a first routing device, a first notification from a map server, the first notification indicating a change in a policy for LISP based communication between at least a first endpoint device and at least a second endpoint device, the first endpoint device being connected to a network fabric through the first routing device and the second endpoint device being connected to the network fabric through a second routing device. The first routing device forwards a second notification to the second routing device if one or more entries of a first map cache implemented by the first routing device are affected by the policy change, the second notification indicating a set of one or more endpoints connected to the second routing device that are affected by the policy change.

20 Claims, 10 Drawing Sheets

(56) References Cited

U.S. PATENT DOCUMENTS

| | | | | |
|---|---|---|---|---|
| 2017/0208635 | A1* | 7/2017 | Grootwassink | H04L 12/4633 |
| 2017/0339623 | A1* | 11/2017 | Pillay-Esnault | H04L 45/16 |
| 2018/0176218 | A1* | 6/2018 | Moreno | H04L 63/20 |
| 2018/0343227 | A1* | 11/2018 | Arango | H04L 61/103 |
| 2019/0037390 | A1* | 1/2019 | Hooda | H04W 8/08 |
| 2019/0268383 | A1* | 8/2019 | Maino | H04L 63/0428 |
| 2020/0162371 | A1* | 5/2020 | Musku | H04L 45/302 |
| 2020/0177629 | A1* | 6/2020 | Hooda | H04L 47/746 |
| 2020/0344662 | A1* | 10/2020 | Maino | H04W 28/0273 |
| 2021/0075689 | A1* | 3/2021 | Ramanathan | H04L 41/147 |

OTHER PUBLICATIONS

International Search Report and Written Opinion from the International Searching Authority, dated Jul. 14, 2021, 13 pages, for corresponding International Patent Application No. PCT/US2021/028790.

Vesely, Vladimir, et al., "Map-Cache Synchronization and Merged RLOC Probing Study for LISP," International Journal on Advances in Intelligent Systems, Jan. 1, 2015, pp. 494-506.

Jeong, Taeyeol, et al., "Experience on the Development of LISP-enabled Services: an ISP Perspective," Proceedings of the 2015 1st IEEE Conference on Network Softwarization (Netsoft), IEEE, Apr. 13, 2015, 9 pages.

\* cited by examiner

The Map-Register message Format is:

700 →

RECEIVE, AT A FIRST ROUTING DEVICE, A FIRST NOTIFICATION FROM A MAP SERVER, THE FIRST NOTIFICATION INDICATING A CHANGE IN A POLICY FOR LOCATOR/ID SEPARATION PROTOCOL (LISP) PROTOCOL BASED COMMUNICATION BETWEEN A FIRST ENDPOINT DEVICE AND A SECOND ENDPOINT DEVICE, THE FIRST ENDPOINT DEVICE BEING CONNECTED TO A NETWORK FABRIC THROUGH THE FIRST ROUTING DEVICE AND THE SECOND ENDPOINT DEVICE BEING CONNECTED TO THE NETWORK FABRIC THROUGH A SECOND ROUTING DEVICE
702

DETERMINE WHETHER ONE OR MORE ENTRIES OF A FIRST MAP CACHE IMPLEMENTED IN THE FIRST ROUTING DEVICE ARE AFFECTED BY THE CHANGE IN THE POLICY, WHEREIN THE ONE OR MORE ENTRIES OF THE FIRST MAP CACHE COMPRISE MAPPING INFORMATION RECEIVED FROM THE MAP SERVER
704

FORWARD A SECOND NOTIFICATION TO THE SECOND ROUTING DEVICE IF THE ONE OR MORE ENTRIES OF THE FIRST MAP CACHE ARE AFFECTED BY THE CHANGE IN THE POLICY, THE SECOND NOTIFICATION INDICATING A SET OF ONE OR MORE ENDPOINTS CONNECTED TO THE SECOND ROUTING DEVICE THAT ARE AFFECTED BY THE CHANGE IN THE POLICY
706

FIG. 7

COMMUNICATION OF POLICY CHANGES IN LISP-BASED SOFTWARE DEFINED NETWORKS

TECHNICAL FIELD

The subject matter of this disclosure relates in general to the field of computer networking, and more particularly to efficient, fast, and scalable communication of policy changes to routing in Locator ID Separation Protocol (LISP) based software defined networks.

BACKGROUND

The enterprise network landscape is continuously evolving. There is a greater demand for mobile and Internet of Things (IoT) device traffic, Software as a Service (SaaS) applications, and cloud adoption. In recent years, software-defined enterprise network solutions have been developed to address the needs of enterprise networks. Software-defined enterprise networking or software defined access (SDA) is a part of a broader technology of software-defined networking (SDN) that includes both software-defined wide area networks (SDWAN) and software-defined local area networks (SDLAN). SDN is a centralized approach to network management which can abstract away the underlying network infrastructure from its applications. This de-coupling of data plane forwarding and control plane can allow a network operator to centralize the intelligence of the network and provide for more network automation, operations simplification, and centralized provisioning, monitoring, and troubleshooting.

Locator ID Separation Protocol (LISP) is a network architecture and protocol which can be used in some SDNs or SDAs. LISP provides improved routing scalability and facilitates flexible address assignment for multi-homing, provider independence, mobility, and virtualization in enterprise networks. For example, LISP offers an alternative to traditional Internet architecture by introducing two separate IP addresses: one to indicate routing locators (RLOCs) for routing traffic through the global Internet and a second address for endpoint identifiers (EIDs) used to identify network sessions between devices.

Some LISP deployments in network fabrics can include policy based routing, in the case of routing within a site (e.g., a data center) as well as across shared services (e.g., Extranet shared services). When using such policy based routing, any changes in policy (e.g., which EIDs may be allowed to communicate), may not be propagated to routers which may be tasked with implementing the policies. A broad stroke approach to instantly communicating all policy changes to all network nodes is not feasible, efficient, or scalable. On the other hand, if stale routing policies are retained at some routers due to the policy changes not having been communicated in a timely manner, then communication may be routed incorrectly, which can lead to information loss, security risks, and/or other undesirable effects.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 7 illustrates a process of communicating selective and collective map notifications based on policy changes, in accordance with some examples;

DETAILED DESCRIPTION

Figure 1:
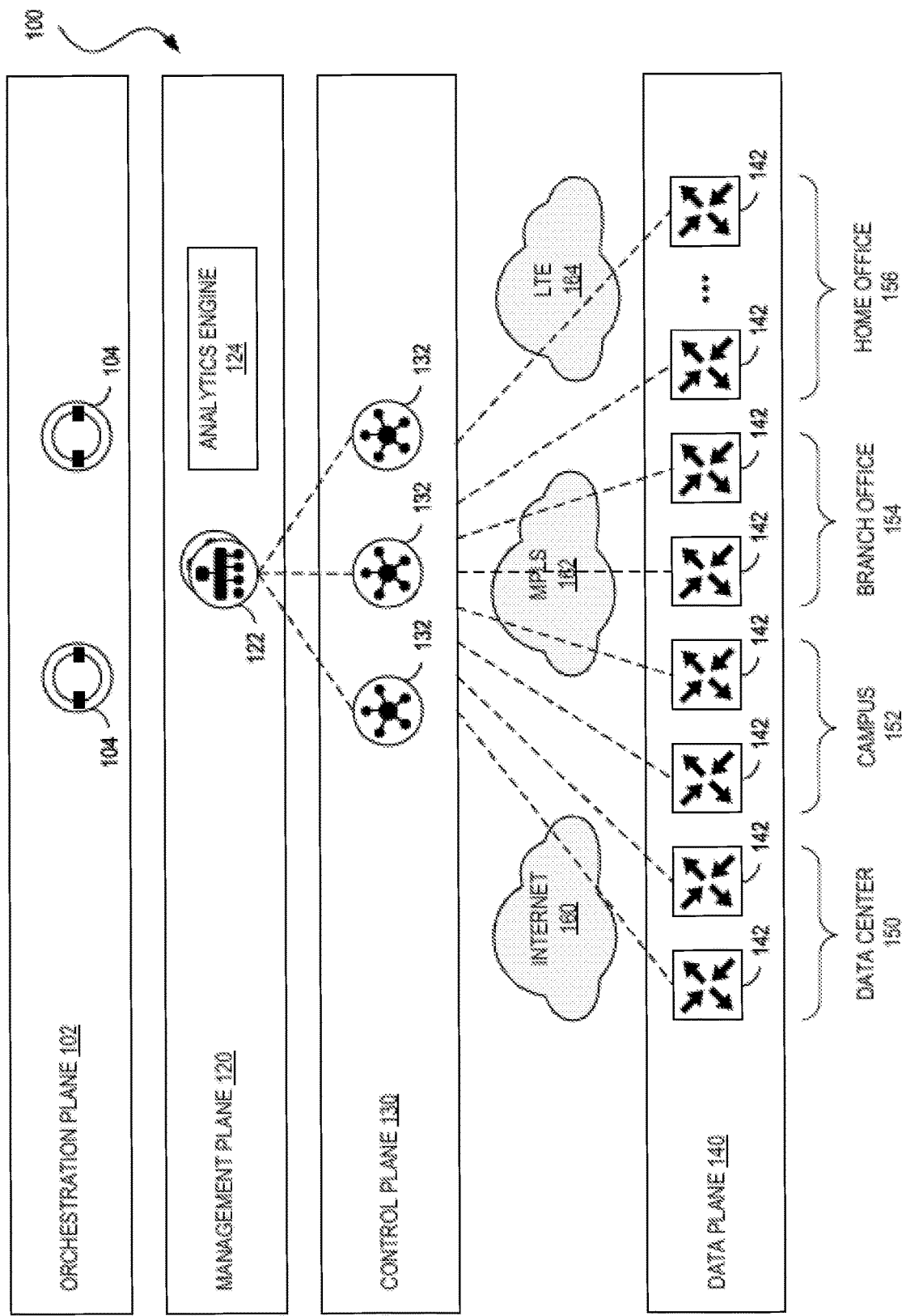
FIG. 1 illustrates a high-level network architecture, in accordance with some examples.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

OVERVIEW

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed herein are systems, methods, and computer-readable media for communicating policy changes in a Locator/ID Separation Protocol (LISP) based network deployment. For example, a first routing device receives a first notification from a map server, the first notification indicating a change in a policy for LISP based communication between a first endpoint device and a second endpoint device, the first endpoint device being connected to a network fabric through the first routing device and the second endpoint device being connected to the network fabric through a second routing device. In some examples, the first notification may be solicited (via a subscription) or may be unsolicited (forced by map-server) by the first or second routing devices. The first notification may be sent instantaneously upon a policy change in mapping policies being effected in the map server, selectively to edge/border devices such as the first routing device which may have previously registered with the map server, endpoints which are affected by the policy change. The first routing device forwards a second notification to the second routing device if one or more entries of a first map cache implemented by the first routing device are affected by the change, the second notification indicating a set of one or more endpoints connected to the second routing device that are affected by the policy change. The second notification is a selective and collective notification, indicating all endpoints of the second routing device which may be affected by the policy change.

In some examples, a method is provided. The method comprises receiving, at a first routing device, a first notification from a map server, the first notification indicating a change in a policy for Locator/ID Separation Protocol (LISP) protocol based communication between a first endpoint device and a second endpoint device, the first endpoint device being connected to a network fabric through the first routing device and the second endpoint device being connected to the network fabric through a second routing device; determining whether one or more entries of a first map cache implemented in the first routing device are affected by the change in the policy, wherein the one or more entries of the first map cache comprise mapping information received from the map server; and forwarding a second notification to the second routing device if the one or more entries of the first map cache are affected by the change in the policy, the second notification indicating a set of one or more endpoints connected to the second routing device that are affected by the change in the policy.

In some examples, a system, is provided, the system comprising one or more processors; and a non-transitory computer-readable storage medium containing instructions which, when executed on the one or more processors, cause the one or more processors to perform operations including: receiving, at a first routing device, a first notification from a map server, the first notification indicating a change in a policy for Locator/ID Separation Protocol (LISP) protocol based communication between a first endpoint device and a second endpoint device, the first endpoint device being connected to a network fabric through the first routing device and the second endpoint device being connected to the network fabric through a second routing device; determining whether one or more entries of a first map cache implemented in the first routing device are affected by the change in the policy, wherein the one or more entries of the first map cache comprise mapping information received from the map server; and forwarding a second notification to the second routing device if the one or more entries of the first map cache are affected by the change in the policy, the second notification indicating a set of one or more endpoints connected to the second routing device that are affected by the change in the policy.

In some examples, a non-transitory machine-readable storage medium is provided, including instructions configured to cause a data processing apparatus to perform operations including: receiving, at a first routing device, a first notification from a map server, the first notification indicating a change in a policy for Locator/ID Separation Protocol (LISP) protocol based communication between a first endpoint device and a second endpoint device, the first endpoint device being connected to a network fabric through the first routing device and the second endpoint device being connected to the network fabric through a second routing device; determining whether one or more entries of a first map cache implemented in the first routing device are affected by the change in the policy, wherein the one or more entries of the first map cache comprise mapping information received from the map server; and forwarding a second notification to the second routing device if the one or more entries of the first map cache are affected by the change in the policy, the second notification indicating a set of one or more endpoints connected to the second routing device that are affected by the change in the policy.

Some examples further comprise, upon forwarding the second notification to the second routing device, modifying or deleting the one or more entries of the first map cache if the one or more entries of the first map cache are affected by the change in the policy In some examples, the second notification further comprises an instruction for the second routing device to delete mappings comprising the set of one or more endpoints in a second map cache implemented by the second routing device.

In some examples, the mapping information received from the map server comprises at least a first map reply received from the map server in response to a first map request sent to the map server from the first routing device, the first map request based on a first request received by the first routing device for the first endpoint device to communicate with the second endpoint device.

In some examples, the first map reply received from the map server is based on a first map policy, wherein the first map policy is modified to a second map policy based on the change in the policy.

Some examples further comprise receiving the second map policy from the map server in response to a second map request from the first routing device, the second map request based on a second request received by the first routing device for the first endpoint device to communicate with the second endpoint device; and updating the first map cache with the second map policy.

In some examples, the first endpoint device and the second endpoint device belong to a common site, the common site implementing a common virtual route forwarding (VRF) network, with instance identifiers (IIDs) of all endpoint devices in the common VRF network being the same.

In some examples, the first endpoint device belongs to a first virtual route forwarding (VRF) network having a first instance identifier (IID) and the second endpoint device belongs to a second VRF network having a second instance identifier (IID), the first and second VRF networks belonging to an Extranet shared service.

DESCRIPTION OF EXAMPLE EMBODIMENTS

FIG. 1 illustrates an example of a network architecture 100 for implementing aspects of the present technology. An example of an implementation of the network architecture 100 is the Cisco® Software Defined Wide Area Network (SD-WAN) architecture. In some examples, the network architecture 100 can correspond to an enterprise fabric or SDA network. However, one of ordinary skill in the art will understand that, for the network architecture 100 and any other system discussed in the present disclosure, there can be additional or fewer component in similar or alternative configurations. The illustrations and examples provided in the present disclosure are for conciseness and clarity. Other examples may include different numbers and/or types of elements but one of ordinary skill the art will appreciate that such variations do not depart from the scope of the present disclosure.

In the illustrated example, the network architecture 100 includes an orchestration plane 102, a management plane 120, a control plane 130, and a data plane 140. The orchestration plane 102 can assist in the automatic on-boarding of edge network devices 142 (e.g., switches, routers, etc.) in an overlay network. The orchestration plane 102 can include one or more physical or virtual network orchestrator appliances 104. The network orchestrator appliance(s) 104 can perform the initial authentication of the edge network devices 142 and orchestrate connectivity between devices of the control plane 130 and the data plane 140. In some aspects, the network orchestrator appliance(s) 104 can also enable communication of devices located behind Network Address Translation (NAT). In some aspects, physical or virtual Cisco® SD-WAN vBond appliances can operate as the network orchestrator appliance(s) 104.

The management plane 120 can be responsible for central configuration and monitoring of the network architecture 100. The management plane 120 can include one or more physical or virtual network management appliances 122. In some embodiments, the network management appliance(s) 122 can provide centralized management of the network via a graphical user interface to enable a user to monitor, configure, and maintain the edge network devices 142 and links (e.g., Internet transport network 160, MPLS network 162, 4G/LTE network 164) in an underlay and overlay network. The network management appliance(s) 122 can support multi-tenancy and enable centralized management of logically isolated networks associated with different entities (e.g., enterprises, divisions within enterprises, groups within divisions, etc.). Alternatively or in addition, the network management appliance(s) 122 can be a dedicated network management system for a single entity. In some embodiments, physical or virtual Cisco® SD-WAN vManage appliances can operate as the network management appliance(s) 122.

The control plane 130 can build and maintain a network topology and make decisions on where traffic flows. The control plane 130 can include one or more physical or virtual network controller appliance(s) 132. The network controller appliance(s) 132 can establish secure connections to each network device 142 and distribute route and policy information via a control plane protocol (e.g., Overlay Management Protocol (OMP) (discussed in further detail below), Open Shortest Path First (OSPF), Intermediate System to Intermediate System (IS-IS), Border Gateway Protocol (BGP), Protocol-Independent Multicast (PIM), Internet Group Management Protocol (IGMP), Internet Control Message Protocol (ICMP), Address Resolution Protocol (ARP), Bidirectional Forwarding Detection (BFD), Link Aggregation Control Protocol (LACP), etc.). In some examples, the network controller appliance(s) 132 can operate as route reflectors. The network controller appliance(s) 132 can also orchestrate secure connectivity in the data plane 140 between and among the edge network devices 142. For example, in some embodiments, the network controller appliance(s) 132 can distribute crypto key information among the network device(s) 142. This can allow the network to support a secure network protocol or application (e.g., Internet Protocol Security (IPSec), Transport Layer Security (TLS), Secure Shell (SSH), etc.) without Internet Key Exchange (IKE) and enable scalability of the network. In some examples, physical or virtual Cisco® SD-WAN vSmart controllers can operate as the network controller appliance(s) 132.

The data plane 140 can be responsible for forwarding packets based on decisions from the control plane 130. The data plane 140 can include the edge network devices 142, which can be physical or virtual network devices. The edge network devices 142 can operate at the edges various network environments of an organization, such as in one or more data centers or colocation centers 150, campus networks 152, branch office networks 154, home office networks 154, and so forth, or in the cloud (e.g., Infrastructure as a Service (IaaS), Platform as a Service (PaaS), SaaS, and other cloud service provider networks). The edge network devices 142 can provide secure data plane connectivity among sites over one or more WAN transports, such as via one or more Internet transport networks 160 (e.g., Digital Subscriber Line (DSL), cable, etc.), MPLS network 162 (or other private packet-switched network (e.g., Metro Ethernet, Frame Relay, Asynchronous Transfer Mode (ATM), etc.), mobile networks 164 (e.g., 3G, 4G/LTE, 5G, etc.), or other WAN technology (e.g., Synchronous Optical Networking (SONET), Synchronous Digital Hierarchy (SDH), Dense Wavelength Division Multiplexing (DWDM), or other fiber-optic technology; leased lines (e.g., T1/E1, T3/E3, etc.); Public Switched Telephone Network (PSTN), Integrated Services Digital Network (ISDN), or other private circuit-switched network; small aperture terminal (VSAT) or other satellite network; etc.). The edge network devices 142 can be responsible for traffic forwarding, security, encryption, quality of service (QoS), and routing (e.g., BGP, OSPF, etc.), among other tasks. In some embodiments, physical or virtual Cisco® SD-WAN vEdge routers can operate as the edge network devices 142.

Figure 2:
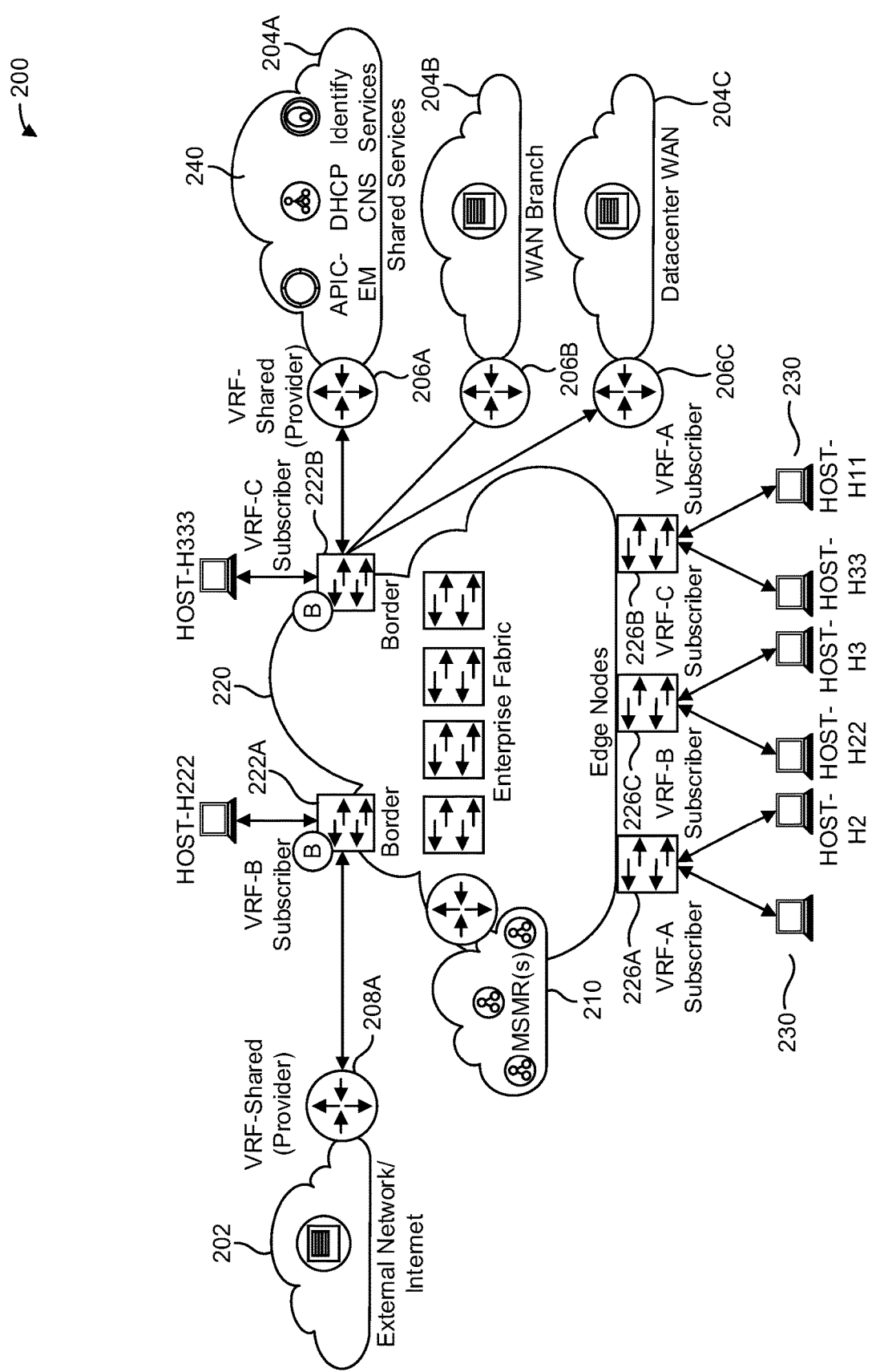
FIG. 2 illustrates a network configured for LISP deployment, in accordance with some examples.

FIG. 2 illustrates an example of a network 200 configured for a LISP deployment environment. In some examples, the network 200 can be implemented using the network architecture 100. As previously mentioned, Locator ID Separation Protocol (LISP) provides improved routing scalability and facilitates flexible address assignment for various uses such as multi-homing, provider independence, mobility, and virtualization. LISP uses two separate IP addresses: one to indicate routing locators (RLOCs) for routing traffic through the global Internet and a second address for endpoint identifiers (EIDs) used to identify network sessions between devices. In some examples, the LISP EID namespace can represent customer end sites in a manner similar to how end sites are defined in non-LISP environments, with a notable difference in that the IP addresses used within these LISP sites are not advertised within the non-LISP Internet or RLOC namespace, e.g., belonging to the enterprise fabric 220. In some examples, end-customer LISP functionality can be deployed on customer endpoint routers which can include an egress tunnel router (ETR) and an ingress tunnel router (ITR). In some examples, an xTR can perform both the LISP functions of an ETR and an ITR.

FIG. 2 illustrates various sites, e.g., virtual route forwarding sites (VRFs), which can include providers such as an external network or internet 202, as well as shared VRFs such as the shared services 204A-C. The shared services can include hosts (e.g., hosts 240 in shared services 204A), for example. Border routers (e.g., xTRs) 222A and 222B can provide access to the shared services 204A-C using routers 206A-C respectively for routing traffic to the core or enterprise fabric 220. Several edge devices 226A-C may include routers for providing access to end units or hosts 230. One or more map servers (or devices implementing a map server/map resolver function) such as an MSMR 210 can maintain and implement routing policies for the various routers (e.g., border devices 222A-B, edge devices 226A-B, or other customer premises equipment (CPE) routers).

Considering the functionality of an ETR in more detail, an ETR (e.g., implemented in the border device 222A) can connect a site (such as the Internet 202) to the LISP-capable part of a core network (e.g., LISP capable part of the enterprise fabric 220). The ETR may publish EID-to-RLOC mappings for the site, respond to Map-Request messages, and decapsulate and deliver LISP-encapsulated user data to end systems at the site. During operation, an ETR sends periodic Map-Register messages to all its configured map servers, such as the MSMR 210. The Map-Register messages may contain all the EID-to-RLOC entries for the EID-numbered networks that are connected to the ETR's site.

In some implementations, an ETR that receives a Map-Request message verifies that the request matches an EID for which it is authoritative, constructs an appropriate Map-Reply message containing its configured mapping information, and sends this message to the ingress tunnel router (ITR) whose RLOCs are listed in the Map-Request message (e.g., the ITR for the border device 222A). For example, an ETR that receives a LISP-encapsulated packet that is directed to one of its RLOCs decapsulates the packet, verifies that the inner header is destined for an EID-numbered end system at its site, and then forwards the packet to the end system using site-internal routing.

On the other hand, an ITR may be configured to find EID-to-RLOC mappings for all traffic destined for LISP-capable sites handled by the ITR (e.g., an ITR of an edge device 226A-C). When the ITR receives a packet destined for an EID, the ITR may first look for the EID in its mapping cache. If the ITR finds a match, it encapsulates the packet inside a LISP header with one of its RLOCs as the IP source address and one of the RLOCs from the mapping cache entry as the IP destination. The ITR then routes the packet normally.

If no entry is found in the ITR's mapping cache, the ITR sends a Map-Request message to one of its configured map resolvers, such as the MSMR 210, and then discards the original packet. When the ITR receives a response to its Map-Request message, it creates a new mapping cache entry with the contents of the Map-Reply message. When another packet, such as a retransmission for the original and, now, discarded packet arrives, the new mapping cache entry is used for encapsulation and forwarding.

The MSMR 210 can be configured to maintain and provide map or routing policies to the various requesting entities such as the ITRs discussed above. The LISP deployments are configured as pull-based mechanisms for obtaining the routing policies using the Map-Request messages, for example. A pull-based mechanism where a policy is provided in a Map-Reply message in response to the Map-Request, for example, is differentiated from a push-based mechanism where any policies and changes thereof may be pushed to communicated using a broadcast dissemination to all nodes. In such LISP deployments based on pull-based mechanisms for obtaining routing policies, the policy changes do not take immediate effect. This is because pertinent entries of the mapping caches are not immediately modified or cleared at the respective ETRs/ITRs immediately upon a policy change being implemented by the MSMR 210. For example, if the ITR stores in its mapping cache a specific mapping in a mapping cache entry based on a Map-Reply from the MSMR 210, a policy change could cause the mapping cache entry to become stale. However, there is no mechanism in existing conventional implementations to modify or delete this mapping cache entry of the ITR immediately upon the occurrence of the policy change. Rather, the mapping caches retain their entries for a relatively long period of time (e.g., 24 hours) before being periodically cleaned up in conventional implementations.

In a given period of time before a mapping cache may be periodically cleaned up, because the conventional LISP protocols operate in the pull-based model, the requests for a map or route (e.g., the Map-Request) may only be transmitted from edge switches or routers (e.g., xTRs) when the edge devices first receive a request from an endpoint. As mentioned above, a received response in the form of a Map-Reply is retained in a mapping cache entry even if a policy change may cause the mapping cache entry to become outdated and incorrect. In conventional implementations, the MSMR 210 is not configured to keep track of all the edge devices from which the MSMR 210 may have received the Map-Requests. Thus, the MSMR 210 may not be capable of determining which edge devices may have received Map-Replies which may be affected by a policy change. Notifying all devices or nodes in the enterprise fabric 220, for example, may not be a feasible option either because of the large number of such devices which are present in typical deployments and the bandwidth and resources that such a broadcast to all nodes may consume.

Further, a lack of a secure protocol message in existing implementations for clearing or modifying the mapping caches can also pose security concerns because allowing such messaging options ad-hoc can enable malicious actors to develop messages which can sabotage entire networks. Even when controllers (e.g., the Cisco DNAC) may be used for provisioning the enterprise fabric 220, for example, such controllers may not be capable of clearing all mapping caches at all devices in a scalable manner which is also fast enough to ensure that MSMR policy changes can be immediately effected in all the edge devices.

Moreover, if the mapping cache entry at an edge device retains a stale or outdated policy for a mapping configuration, then this outdated policy can allow or disallow a communication between some endpoint EIDs for example, which would be conflicting with the latest or current policy in place based on the policy change. Such conflicts can pose security risks and business impacts, e.g., for Enterprise deployments. While in some LISP-capable sites (e.g., within a data center, host, VRF, VN, etc.) it is possible to utilize dynamic xTR based LISP route learning mechanisms which can issue solicited map requests (SMRs) based on data traffic patterns, such implementations are also not suitable when an MSMR is used for maintaining routing policies, when there is a lack of data traffic, or LISP based communication is implemented across sites as shown in FIG. 2.

Accordingly, it is important that the policy change be propagated in short order (e.g., immediately upon the change being implemented in the MSMR 210) in a selective and scalable manner. In example aspects of this disclosure, effective techniques for communicating policy changes in a selective, efficient, and scalable manner are disclosed, which address the above-described needs and challenges in existing implementations.

In some example aspects of this disclosure, a map server such as the MSMR is configured to generate and transmit LISP mapping notifications (or publications) to a selected set of nodes (e.g., a subset of nodes) of the network. The selected set of nodes can include edge devices or border nodes which may be impacted by a policy change. For example, the selected set of nodes may have sent Map-Requests to the MSMR, where the Map-Requests (and/or related Map-Replies from the MSMR) may have included EIDs or prefixes which may be affected by a policy change implemented by the MSMR. In some examples, the selected set of nodes may have registered EIDs or prefixes with the MSMR, where such registered EIDs or prefixes may belong to sites (e.g., VNs/VRFs) which may be affected by the policy change.

In some implementations, the MSMR can track and maintain a list of all edge/border devices associated with source and destination EIDs included in the Map-Requests received by the MSMR. The MSMR can determine a selected set of such edge devices if a policy change may affect the EIDs in this list. In some implementations, the selected edge/border nodes may have registered the prefixes/EIDs affected by a policy change or be routers for VNs/VRFs impacted by the policy change. Additionally or alternatively, the selected edge/border nodes may have subscribed for policy changes, e.g., according to LISP publisher-subscriber mechanisms. The selected edge/border nodes may be aware of the traffic flows which are impacted by the policy change and the traffic flows which would not be affected by the policy change within a respective site, in some examples.

Upon receiving the notifications about policy changes from the MSMR at the selected edge/border devices, these edge/border devices may generate selective and collective SMRs directed to border/edge devices (as explained further below) for all the traffic flows or endpoints impacted by the policy changes. In the case of shared services implementing an Extranet, for example, a selective and collective map-notification can be generated and transmitted by the MSMR towards the edge or border devices (e.g., devices 206A-C for shared services 204A-C) for all prefixes affected by the policy change, along with indications of the EIDs associated with the different VRFs/VNs which may be behind the same edge device.

Figure 3:
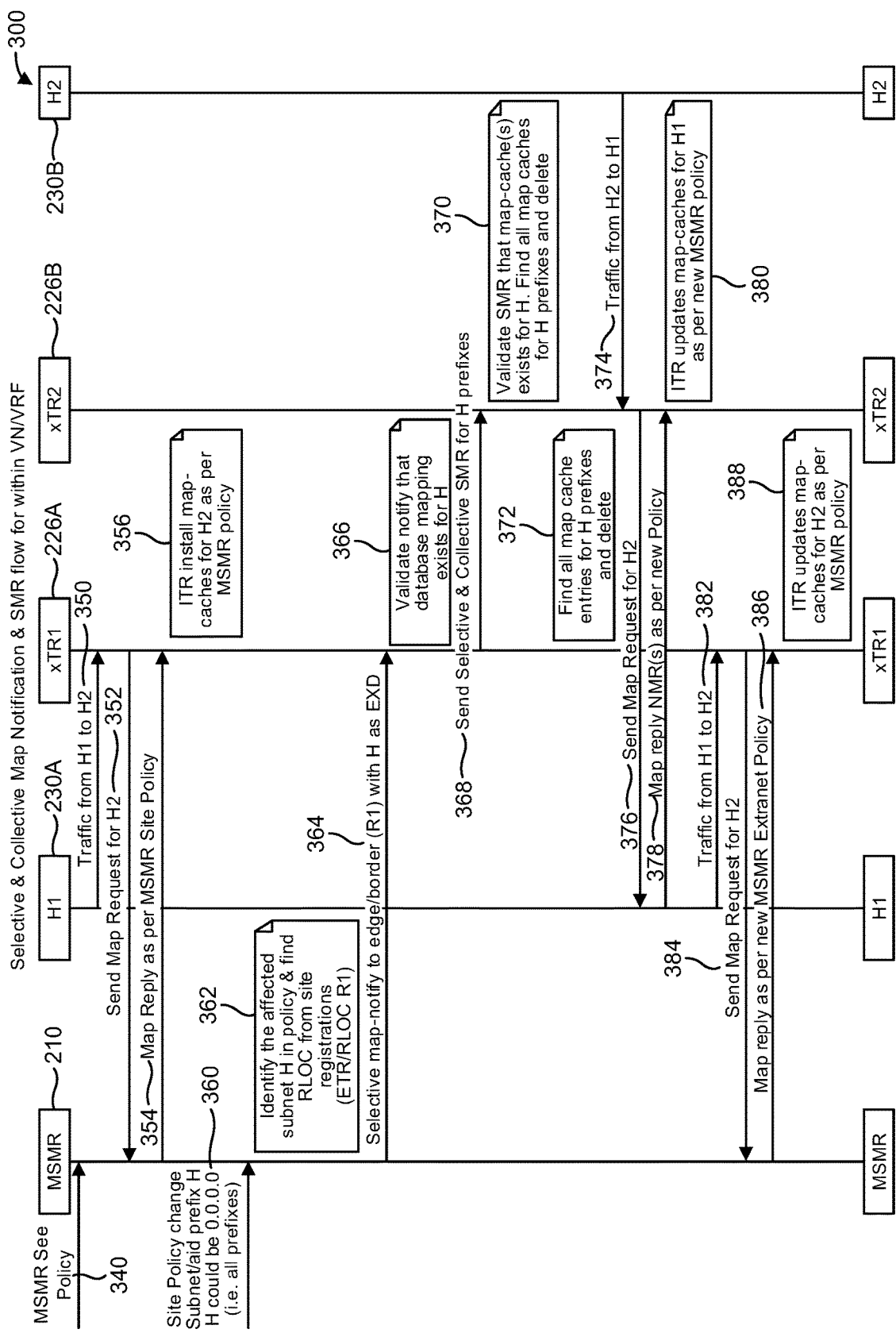
FIG. 3 illustrates a process flow for receiving and forwarding selective and collective map notifications based on policy changes within a network site, in accordance with some examples.

FIG. 3 is a flow diagram 300 illustrating example aspects of selective and collective map notifications and SMRs within a site implementing LISP. For example, the flow diagram 300 can be implemented by one or more edge devices such as routers 226A and 226B shown in FIG. 2 for communication between respective hosts 230 and the enterprise fabric 220. In some examples, two endpoint hosts H1 and H2 may be behind the same xTR or different xTRs, where the hosts H1 and H2 may belong to the same site such as VRF-A. In FIG. 3, host H1 (designated as 230A) may be behind an edge device 226A implementing xTR1, and host H2 (designated as 230B) may be behind an edge device 226B implementing xTR2. The edge devices 226A and 226B may include ETRs and/or ITRs (or xTRs) for handling and routing requests between the hosts H1 and H2 using LISP protocols. For example, the edge devices 226A-B can obtain policies governing communication or data flow between endpoints located in VRF-A from the MSMR 210.

In an illustrative example, at 340, the MSMR 210 can be updated or instantiated with a site policy which may be applicable to the site, VRF-A. At 350, the host H1 (230A) may transmit data traffic intended for the host H2 (230B) to xTR1 (226A) or more specifically, an ITR provided in the xTR1. At 352, the ITR located in xTR1 can send a Map-Request for communicating with the endpoint host H2. At 354, the MSMR 210 may provide a Map-Reply as per the current MSMR site policy (configured at 240) for the Map-Request. For example, MSMR 210 may provide a Map-Reply to xTR1 which includes map information such as the EID for H2 and the RLOC identifying the xTR2 (226B) as the router behind which the destination host H2 is located. Further, the MSMR 210 can receive and respond to this Map-Request and Map-Reply as R1 in aspects of this disclosure. At 356, the ITR in xTR1 can install in its map caches, the map information for the communication between the endpoints H1 and H2 according the MSMR policy, e.g., at a particular map cache entry. Although not explicitly shown, H1 may send traffic to H2 using the mapping information in the map cache entry, e.g., by forwarding the data to xTR2, which would then send the data to the host H2 using LISP protocols. The xTR2 can also store in its own map cache, the map information for communication between H1 and H2.

At 360, there may be a change to the site policy configuration in the MSMR 210. For example, subnets having prefixes H may be prevented from communicating with one another. This could mean that H1 may no longer communicate with H2 using the map information stored in the map cache entry at 356.

If this policy change is not communicated to xTR1, then xTR1 may continue to forward traffic intended for H2 to xTR2 based on the initial policy stored in its map cache. If xTR2 receives such traffic from xTR1 but xTR2 may no longer be allowed to support the communication between the endpoints H1 and H2 as per the new policy. It is noted that in general, a solicited map request (SMR) can only be generated when the endpoint H2 is no longer behind xTR2. However, in this example, H2 continues to be present but only the associated policy is changed on map server MSMR 210 due to the new policy being in effect. Thus, in this example, no SMR would be generated and xTR1 would continue to send the traffic towards xTR2, thus violating the new policy.

However, the above drawbacks can be overcome according to aspects of this disclosure. As described below in further detail, a selective & collective SMR to be generated to cause the new policy to be applied immediately upon the new policy being made effective on the map server.

According to an example aspect of this disclosure, the MSMR 210 can identify, at 362, the affected subnet H in the policy change at 360, as well as the RLOC from the site registrations. This would reveal the registration R1 noted above. Based on this registration R1, at 364, the MSMR 210 can send a selective map-notify to the edge/border device associated with the registration R1, the map-notify pertaining to the map configuration having the subnet at prefix H as its destination EID. This edge/border device is the xTR1 (226A) in the above example. Thus, rather than send the map-notify to all edge devices in the enterprise fabric 220, the MSMR 210 can selectively notify only the edge/border devices such as the edge device 226A which is registered as having a policy for communicating with EIDs having prefixes H in this example (keeping in mind that in other examples, there may be two or more such devices that the selective map-notify can be sent to, based on their registrations).

At 366, xTR1 validates that a database mapping exists for the destination H, e.g., the map cache entry exists in its map cache. Although the Map-Request at 352 may have been for the specific EID H2, the policy change can affect all prefixes H in this example. Further, xTR1 is aware of at least the EID H2 being located behind xTR2 based on the RLOC stored in the map cache entry. Accordingly, at 368, xTR1 forwards the selected notification to xTR2 to inform xTR2 of the policy change. The selected notification pertains not only to the specific EID H2 which may have been stored in the map cache of xTR1, but all the prefixes H of xTR2 which are affected by the policy change. Thus, the notification at 368 is referred to as a selective and collective SMR, which is sent selectively to xTR2 (based on the map cache entry of xTR1 indicating xTR2 in its RLOC) and collectively to all EIDs with H prefixes behind the xTR2. At 372, upon sending the notification, xTR1 deletes all map cache entries in its map cache which have H prefixes according to this example (e.g., including the map cache entry for communicating between H1 and H2 according to the original but outdated policy).

At 370, upon receiving the selective and collective SMR from xTR1, xTR2 validates the SMR to determine that map cache entries exist for the H prefixes (e.g., the map cache entry for communicating between H1 and H2). The xTR2 can then delete all map cache entries which are detected as having H prefixes, e.g., all endpoints such as H2. Once the map cache entries corresponding to H prefixes have been deleted from both xTR1 and xTR2, the policy change at 360 is considered to have been successfully communicated from the MSMR 210 to the edge/border nodes which are affected by the policy change.

Subsequently, any communication between hosts can be based on pulling the new policy from the MSMR. For example, for traffic originating from H2 and destined for H1 at 374, xTR2 can send a new Map-Request for the destination H1 at 376, obtain a corresponding new registration in a Map-Reply from the MSMR 210 at 378, install the new map per the new policy in its ITR at 380 and proceed with communication between H2 and H1. Similarly, for traffic originating from H1 and destined for H2 at 382, xTR1 can send a new Map-Request for the destination H2 at 384, obtain a corresponding new registration in a Map-Reply from the MSMR 210 at 386, install the new map per the new policy in its ITR at 388 and proceed with communication between H1 and H2.

In this manner, the policy change can be efficiently conveyed or communicated in an effectively instantaneous manner from the MSMR 210 to the selected set of nodes using the selective and collective SMRs and related aspects of the flow diagram 300 for LISP communication within a site.

Figure 4:
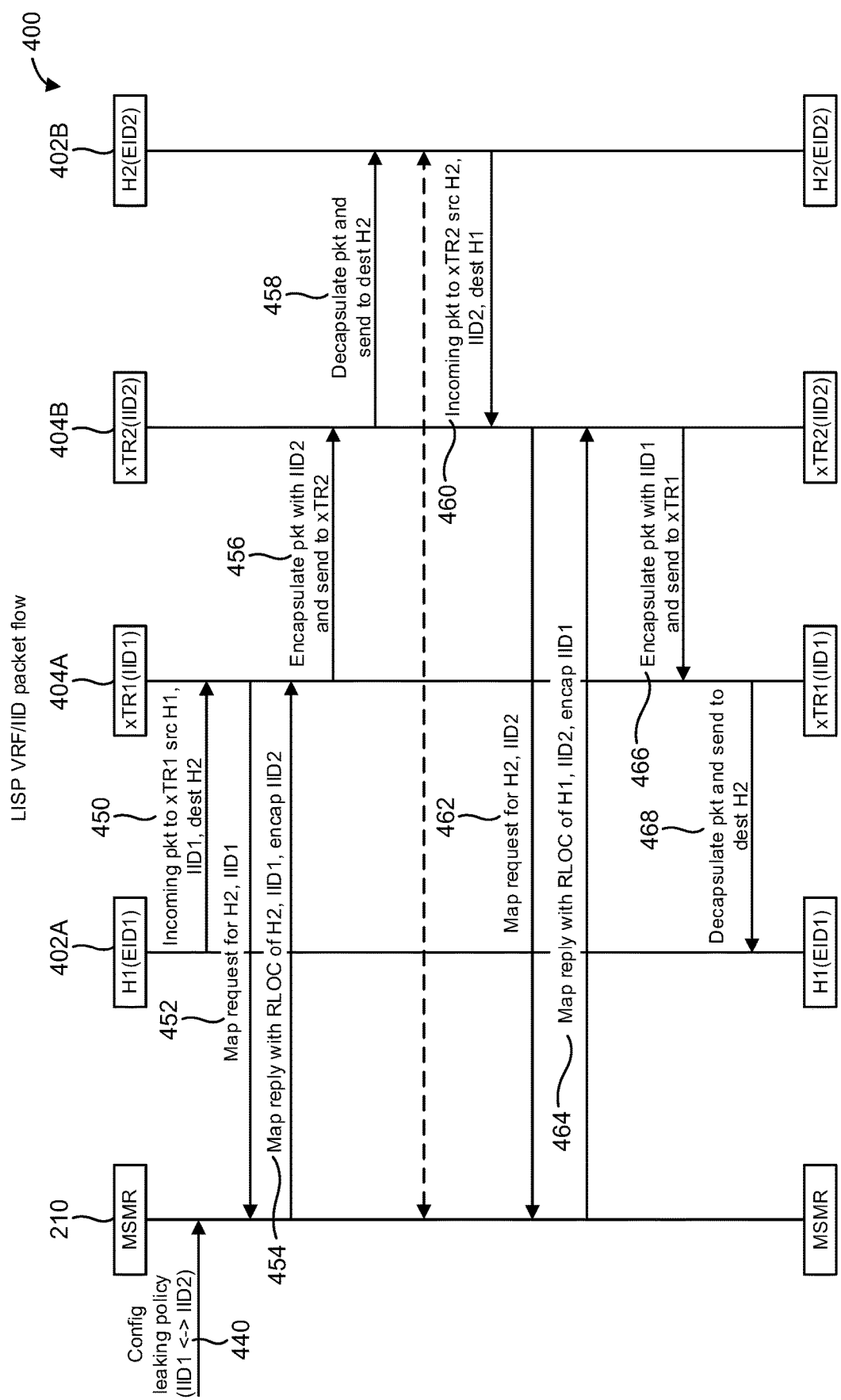
FIGS. 4-5 illustrate process flows for receiving and forwarding selective and collective map notifications based on policy changes in an Extranet shared service, in accordance with some examples.
Figure 5:
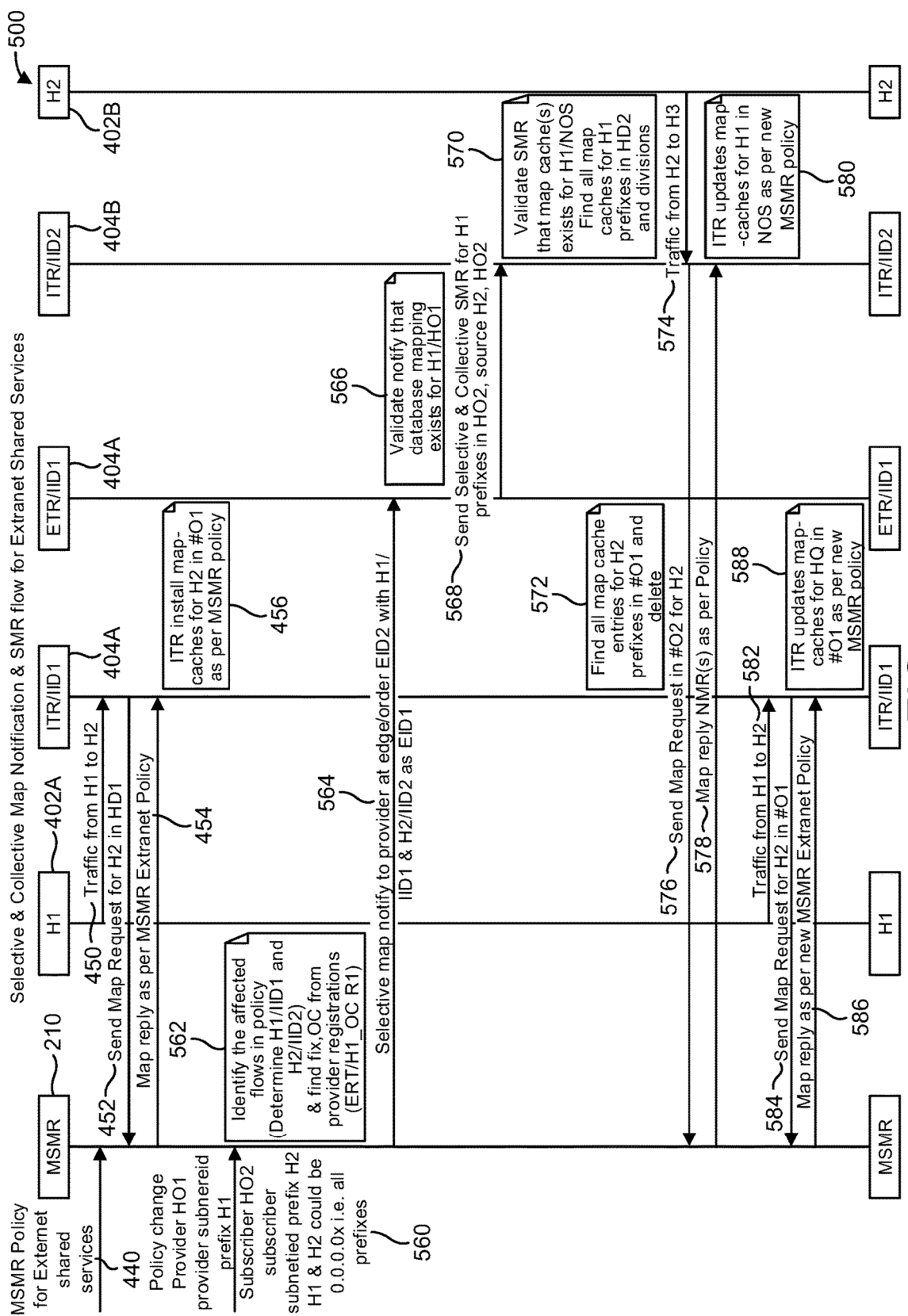

FIGS. 4-5 are directed to flow diagrams for LISP based communication between different sites, e.g., for shared services such as Extranet shared services. The enterprise fabric 220 or other campus fabric architecture can use LISP as its overlay protocol for VNs/VRFs to provide segmentation, isolation, security, etc., in an Extranet shared network such as the shared services 204A-C. The LISP can bind VRFs to instance IDs (IIDs) and include such IIDs in the LISP headers to provide traffic flow separation for single or multi-hop links. LISP learned mappings can be kept within the same instance ID (IID) or VRF context and not shared across IIDs or VRFs. When two hosts (subscriber and provider) communicate with one another across the IIDs, the LISP mappings can be shared across the IIDs. This communication support across IIDs is called Extranet or LISP VRF Leaking.

The following illustrative example is used to explain Extranet or LISP leaking, where hosts H1, H2 are in VRF A corresponding to IID 1000, host H11 is in VRF B corresponding to IID 2000, and host H22 is in VRF C corresponding to IID 3000. All hosts in VRF A, VRF B, and VRF C can access shared services from server H3 in VRF S, corresponding to IID 5000. An extranet policy on the MSMR (xTR3) for implementing this configuration can be based on the ETRs (xTR1 and xTR2) detecting local hosts (H1, H11 and H2, H22 respectively) and registering them in the corresponding source IIDs (1000, 2000 and 3000). When an ITR (xTR1) receives a request from H1 to communicate to H3, it generates map-requests for destination prefix (H3) in the context of source IID 1000. The MSMR (xTR3) can receive the map-request but would not find the destination EID/prefix, H3, in the source IID context (1000). Thus, the MSMR would look up H3 in the extranet policy table to determine the destination IID (5000), add the destination IID (5000) as encapsulation IID to the map-reply packet, and send the map-reply packet to xTR1.

Upon receiving the map reply, xTR1 can install the destination VRF as the encapsulation IID (5000) with the EID and RLOC in its map-cache. The xTR1 can use the source IID (1000) to match the incoming packets from its hosts and encapsulate the packets towards remote RLOCs with encapsulation IID (5000) instead of source IID (1000). The MSMR facilitates routing among the EID prefixes by forwarding or replying to map requests from the ITRs. The extranet policy defined on MSMR decides leaking across VRFs to facilitate extranet communication as described above.

Referring to the flow diagram 400 of FIG. 4, aspects of LISP communication related to endpoints or hosts in a shared service managed by two or more routers are shown. The hosts H1 and H2 may belong to a shared service such as the shared service 204A, but have different IIDs. Two border devices such as routers 404A and 404B may be associated with the hosts H1 and H2 respectively, where the border devices may be similar to the border devices 222A-B for communicating with the enterprise fabric 220 based on policy obtained from the MSMR 210 as described with reference to FIG. 4.

In an illustrative example, at 440, the MSMR 210 can be updated or instantiated with an Extranet leaking policy which may be applicable to the shared Extranet site for communication between hosts at different VRFs or IIDs, such as IID1 and IID2. At 450, the xTR1 (404A) or an ITR located in xTR1 can receive incoming packets from H1 (402A) having an EID of EID1, specifying a destination H2. At 452, the xTR1 can send a Map-Request for communicating with the endpoint H2 from IID1. At 454, the MSMR 210 may provide a Map-Reply as per the current MSMR leaking policy (configured at 440) for the Map-Request. For example, MSMR 210 may provide a Map-Reply to xTR1 which includes map information such as the RLOC for H2 (with an EID in IID2) in an encapsulated packet. Further, the MSMR 210 can receive and reply to this Map-Request and Map-Reply as R1 in aspects of this disclosure. At 456, the xTR1 can encapsulate the packet in in the request with IID2 and send it to xTR2. At 458, xTR2 decapsulates the packet and sends it to the destination H2.

A similar process is followed for communication from H1 to H2. At 462, the xTR2 can send a Map-Request for communicating with the endpoint H1 from IID2. At 464, the MSMR 210 may provide a Map-Reply as per the current MSMR leaking policy (configured at 440) for the Map-Request. For example, MSMR 210 may provide a Map-Reply to xTR2 which includes map information such as the RLOC for H1 (with an EID in IID1) in an encapsulated packet. Further, the MSMR 210 can register this Map-Request and Map-Reply as R2 in aspects of this disclosure. At 466, the xTR2 can encapsulate the packet in in the request with IID1 and send it to xTR1. At 468, xTR2 decapsulates the packet and sends it to the destination H1.

FIG. 5 is a flow diagram 500 illustrating aspects of communicating policy changes. The steps 440 and 450-454 are repeated from FIG. 4. In FIG. 5, the ITR and ETR are shown separately for the xTR1 404A of FIG. 4. The ITR/IID2 is similar to the xTR2 (404B). Hosts H1 and H2 may be located at different sites, IID1 and IID2. Upon sending a request to communicate from H1 to H2, the map request and map reply as per steps 450-454, the ITR/IID1 can store in its map cache the MSMR policy for communication between H1/IID1 and H2/IID2 at 456.

At 560, there may be a change to the Extranet policy configuration in the MSMR 210. For example, subnets having prefix H1 in IID1 may be prevented from communicating with one or more subnets in IID2 including the prefix H2. This could mean that H1 may no longer communicate with H2 using the map information stored in the map cache entry at 456.

According to an example aspect of this disclosure, the MSMR 210 can identify, at 462, the affected EIDs (H1/IID1 and H2/IID2) in the policy change at 560, as well as the RLOC from the registrations. This would reveal the registration R1 noted above. Based on this registration R1, at 564, the MSMR 210 can send a selective map-notify to the border device associated with the registration R1, the map-notify pertaining to the map configuration having the H1/IID1 and H2/IID2 as EIDs.

At 566, this notification received by the ETR/IID1 (404A) is validated that a database mapping exists for the H1/IID1 mapping, e.g., the map cache entry exists in its map cache. At 568, ETR/IID1 (404A) sends a selective and collective SMR for H1 prefixes in IID2 for source H2/IID2 to ITR/IID2 (404B). Correspondingly, ITR/IID1 (404A) finds all map cache entries for H2 prefixes in IID1 and deletes them.

At 570, upon receiving the selective and collective SMR, the ITR/IID2 validates the notification to determine that map cache entries exist for H1/IID1 and finds all map caches for H1 prefixes in IID2 and deletes them. At 572, all map cache entries for H2 prefixes are deleted. Once the map cache entries corresponding to H1 and H2 prefixes have been deleted from both map caches in 404A and 404B, the policy change at 560 is considered to have been successfully communicated from the MSMR 210 to the border devices 404A and 404B which are affected by the policy change.

Subsequently, any communication between hosts H1 and H2 can be based on pulling the new policy from the MSMR. For example, for traffic originating from H2 and destined for H1 at 574, ITR/IID1 can send a new Map-Request for the destination H1/IID1 at 576, obtain a corresponding new policy in a Map-Reply from the MSMR 210 at 578, install the new map per the new policy in its map cache at 580 and proceed with communication between H2 and H1. Similarly, for traffic originating from H1 and destined for H2 at 582, ITR1/IID1 can send a new Map-Request for the destination H2/IID2 at 584, obtain a corresponding new registration in a Map-Reply from the MSMR 210 at 586, install the new map per the new policy in its map cache at 588 and proceed with communication between H1 and H2.

Accordingly, as can be observed from the flow diagram 500, the MSMR 210 can provide the IIDs and subnets of the receiver ITR (ITR/IID2) and sender ETR (ETR/IID1) in an example unsolicited map-notify message from the MSMR based on the changed MSMR policy, at step 562. While sending the selective and collective SMR from the ETR/IID1 at step 568, both of the receiver ITR's IID (IID2) and subscriber prefixes (H2) as well sender/provider ETR's IID (IID1) and provider prefixes (H1) can be encoded in the message sent at 568. The receiver ITR/IID2 can process the SMR notification received at 568 for H1 destinations in its own instance-id (IID2) context. An advantage of sending the ITR's instance-id (IID2) lies in the ITR/IID2 being able to avoid a search to find its instance-id or the context to process the SMR message. Another advantage is that, even though the policy change may affect the ETR subnet H1/IID1, if the ITR/IID1 has multiple map-caches in different instances for the ETR's IID1 and prefixes, only map-caches corresponding to IID2 would be modified. As will be appreciated, the above approach is applicable for both policy changes to providers as well as subscribers, and can update map-caches at both provider and subscriber sides.

Figure 6A:
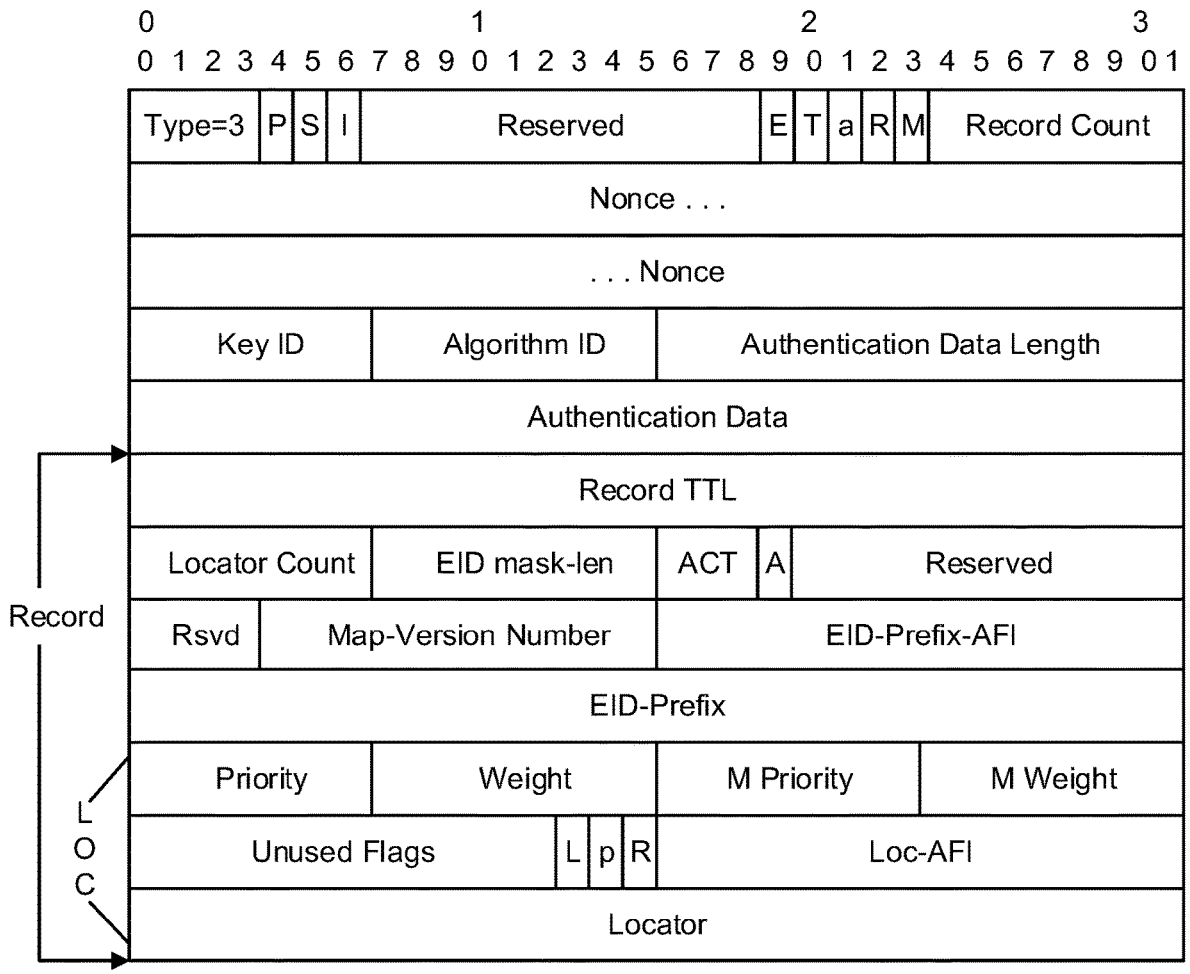
FIGS. 6A-C illustrate message formats for selective and collective map notifications based on policy changes, in accordance with some examples.
Figure 6B:
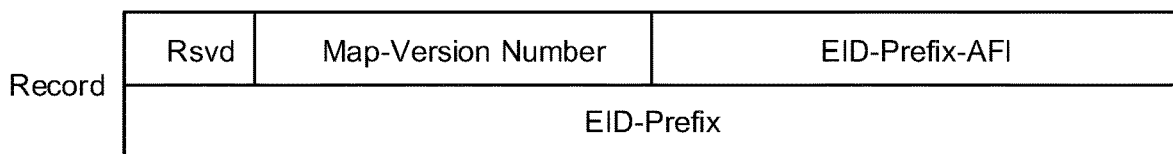

In this manner, the policy change can be efficiently conveyed or communicated in an effectively instantaneous manner from the MSMR 210 to the selected set of nodes using the selective and collective SMRs and related aspects of the flow diagram 500 for LISP communication deployed in Extranet shared services. FIG. 6A shows In some examples, the selective and collective map-notification and SMR messages discussed above can be implemented using message formats as shown and described with reference to FIGS. 6A-C. FIG. 6A shows a conventional Map-Register format. To identify traffic the flow, source and destination prefixes and their respective VN IDs can be encoded in an EID prefix of the Map-Register format of FIG. 6A using the field LCAF (EID-Prefix-AFI=16387 (LCAF) with Type 1: LIST Type) or using multiple records in above map-notify message. The message can carry special identification (e.g., private LCAF or other) to indicate a special "Selective & collective" Map-Notify, for example, as shown in FIG. 6B with an example EID-prefix field.

Figure 6C:
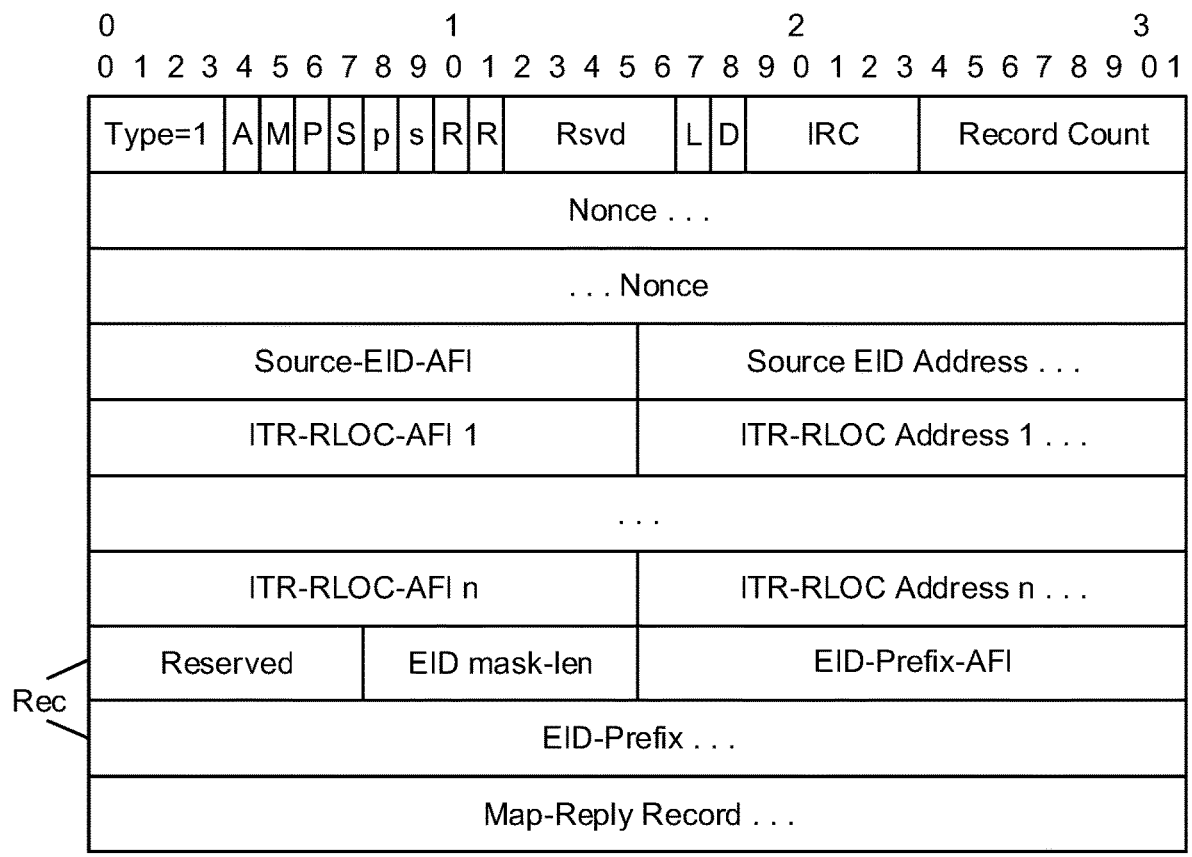

FIG. 6C shows Map-Request message format with the SMR shown as a map request message with the S/P bit set. The Map-Request message format is one example format among other possible formats which can include different encodings or formats for communicating the information shown and described with reference to FIG. 6C. Following the EID record, a map request message can be encoded using LCAF encoding (EID-Prefix-AFI=LCAF) and can be used to carry the source EID IID. This message can include an identification (e.g., private LCAF or other) to indicate the special "Selective & collective" SMR format. In some examples, the sender ITR VN's ID can be encoded in the Source-EID field of the map-request message using LCAF (Source-EID-AFI=16387(LCAF) with Type 2: Instance ID Type).

Having described example systems and concepts, the disclosure now turns to the process 700 illustrated in FIG. 7. The blocks outlined herein are examples and can be implemented in any combination thereof, including combinations that exclude, add, or modify certain steps.

At the block 702, the process 700 includes receiving, at a first routing device, a first notification from a map server, the first notification indicating a change in a policy for Locator/ID Separation Protocol (LISP) protocol based communication between a first endpoint device and a second endpoint device, the first endpoint device being connected to a network fabric through the first routing device and the second endpoint device being connected to the network fabric through a second routing device. For example, the first notification (e.g., 364 or 564) can be received from the MSMR 210 and can include a selective map-notify (unsolicited by any edge/border device) to a selected subset of edge/border devices, e.g., routing devices which have previous registrations (e.g., registration R1) with the MSMR 210 and have been determined to have prefixes or endpoints which may be affected by a policy change in the MSMR 210.

In some examples, the first endpoint device (e.g., 230A) and the second endpoint device (e.g., 230B) can belong to a common site (e.g., VRF-A), the common site implementing a common virtual route forwarding (VRF) network with endpoint devices in the common VRF network having the same instance identifiers (IIDs), where the first routing device (e.g., 226A) and the second routing device (e.g., 226B) can each include edge devices implementing respective xTRs to connect the endpoint devices to the enterprise fabric 220.

In another example, the first endpoint device (e.g., 402A) belongs to a first virtual route forwarding (VRF) network having a first instance identifier (e.g., IID1) and the second endpoint device (e.g., 402B) belongs to a second VRF network having a second instance identifier (e.g., IID2), the first and second VRF networks belonging to an Extranet shared service (e.g., service 204A), with the first and second routing devices being border devices (e.g., 222B) for connecting endpoints of the shared service to the enterprise fabric 220. In the various examples discussed herein, the first routing device and the second routing device can either be connected to a provider or a subscriber without deviating from the scope of the description of example aspects.

At the block 704, the process 700 includes determining whether one or more entries of a first map cache implemented in the first routing device are affected by the change in the policy, wherein the one or more entries of the first map cache comprise mapping information received from the map server. For example, at 366 or 566, the respective map caches may validate the map-notify received from the MSMR 210 and determine whether the map caches may have one or more entries with mapping information which may be affected by the policy change. The mapping information in the map caches may have been based on map policies previously received from the map server, such as at least a first map reply (e.g., 354/454) received from the map server in response to a first map request (e.g., 352/452) sent to the map server from the first routing device, the first map request based on a first request (e.g., 350/450) received by the first routing device for the first endpoint device to communicate with the second endpoint device.

At the block 706, the process 700 includes, forwarding a second notification to the second routing device if the one or more entries of the first map cache are affected by the change in the policy, the second notification indicating a set of one or more endpoints connected to the second routing device that are affected by the change in the policy. For example, at 368/568 the first routing devices (e.g., 226A/404A) may forward the selective and collective SMR to the second routing devices (e.g., 226B/404B). The second notification (selective and collective SMR) can include an instruction for the second routing device to delete mappings (e.g., 370/570) comprising the set of one or more endpoints in a second map cache implemented by the second routing device.

In some examples, upon forwarding the second notification to the second routing device, the first routing device can modify or delete the one or more entries of the first map cache if the one or more entries of the first map cache are affected by the change (e.g., at 372/572).

In some examples, the first map reply received from the map server is based on a first map policy (e.g., at 340/440), where the first map policy is modified to a second map policy based on the change in the policy (e.g., at 360/560). Accordingly, the process 700 can further include receiving the second map policy (e.g., 386/586) from the map server in response to a second map request (e.g., 384/584) from the first routing device, the second map request based on a second request (e.g., 382/582) received by the first routing device for the first endpoint device to communicate with the second endpoint device, and updating the first map cache with the second map policy (e.g., 388/588).

Figure 8:
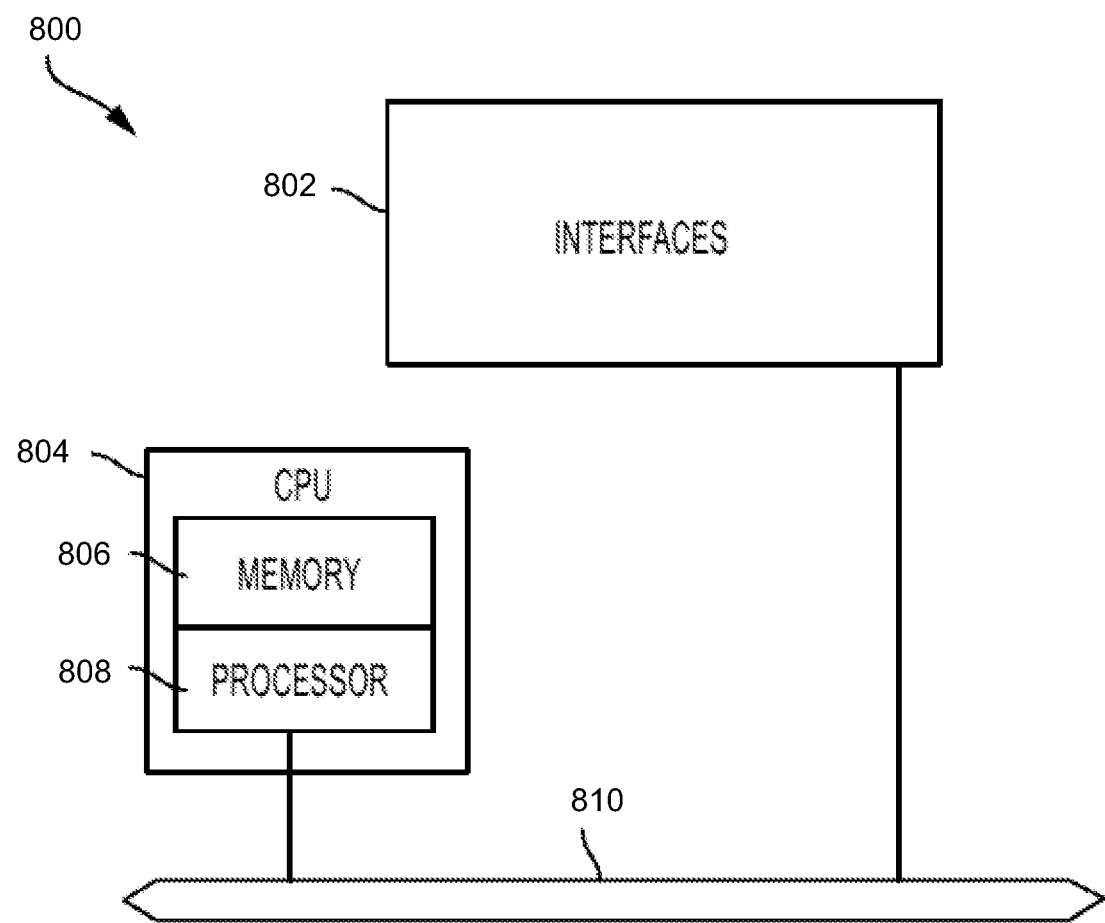
FIG. 8 illustrates an example network device in accordance with some examples.

FIG. 8 illustrates an example network device 800 suitable for implementing the aspects according to this disclosure. In some examples, the edge/border devices or other devices, hosts, servers, etc., discussed above may be implemented according to the configuration of the network device 800. The network device 800 includes a central processing unit (CPU) 804, interfaces 802, and a connection 810 (e.g., a PCI bus). When acting under the control of appropriate software or firmware, the CPU 804 is responsible for executing packet management, error detection, and/or routing functions. The CPU 804 preferably accomplishes all these functions under the control of software including an operating system and any appropriate applications software. The CPU 804 may include one or more processors 808, such as a processor from the INTEL X86 family of microprocessors. In some cases, processor 808 can be specially designed hardware for controlling the operations of the network device 800. In some cases, a memory 806 (e.g., non-volatile RAM, ROM, etc.) also forms part of the CPU 804. However, there are many different ways in which memory could be coupled to the system.

The interfaces 802 are typically provided as modular interface cards (sometimes referred to as "line cards"). Generally, they control the sending and receiving of data packets over the network and sometimes support other peripherals used with the network device 800. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the CPU 804 to efficiently perform routing computations, network diagnostics, security functions, etc.

Although the system shown in FIG. 8 is one specific network device of the present technologies, it is by no means the only network device architecture on which the present technologies can be implemented. For example, an architecture having a single processor that handles communications as well as routing computations, etc., is often used. Further, other types of interfaces and media could also be used with the network device 800.

Regardless of the network device's configuration, it may employ one or more memories or memory modules (including memory 806) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. The memory 806 could also hold various software containers and virtualized execution environments and data.

The network device 800 can also include an application-specific integrated circuit (ASIC), which can be configured to perform routing and/or switching operations. The ASIC can communicate with other components in the network device 800 via the connection 810, to exchange data and signals and coordinate various types of operations by the network device 800, such as routing, switching, and/or data storage operations, for example.

Figure 9:
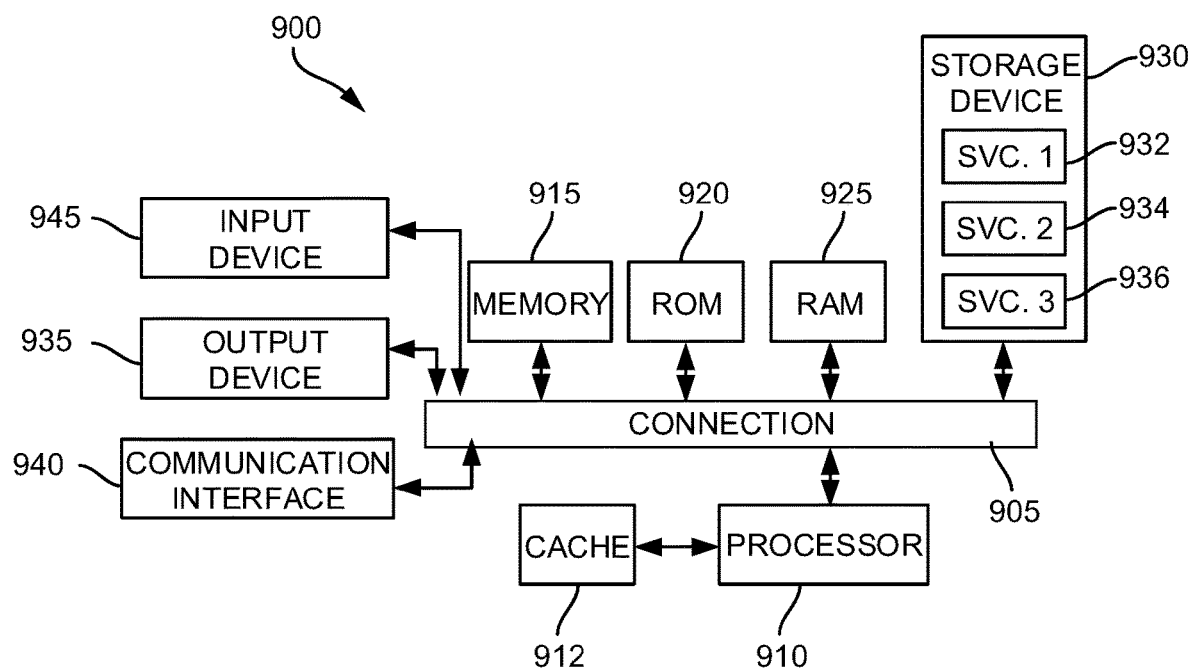
FIG. 9 illustrates an example computing device architecture, in accordance with some examples.

FIG. 9 illustrates an example computing device architecture 900 of an example computing device which can implement the various techniques described herein. The components of the computing device architecture 900 are shown in electrical communication with each other using a connection 905, such as a bus. The example computing device architecture 900 includes a processing unit (CPU or processor) 910 and a computing device connection 905 that couples various computing device components including the computing device memory 915, such as read only memory (ROM) 920 and random access memory (RAM) 925, to the processor 910.

The computing device architecture 900 can include a cache of high-speed memory connected directly with, in close proximity to, or integrated as part of the processor 910. The computing device architecture 900 can copy data from the memory 915 and/or the storage device 930 to the cache 912 for quick access by the processor 910. In this way, the cache can provide a performance boost that avoids processor 910 delays while waiting for data. These and other modules can control or be configured to control the processor 910 to perform various actions. Other computing device memory 915 may be available for use as well. The memory 915 can include multiple different types of memory with different performance characteristics. The processor 910 can include any general purpose processor and a hardware or software service, such as service 1 932, service 2 934, and service 3 936 stored in storage device 930, configured to control the processor 910 as well as a special-purpose processor where software instructions are incorporated into the processor design. The processor 910 may be a self-contained system, containing multiple cores or processors, a bus, memory controller, cache, etc. A multi-core processor may be symmetric or asymmetric.

To enable user interaction with the computing device architecture 900, an input device 945 can represent any number of input mechanisms, such as a microphone for speech, a touch-sensitive screen for gesture or graphical input, keyboard, mouse, motion input, speech and so forth. An output device 935 can also be one or more of a number of output mechanisms known to those of skill in the art, such as a display, projector, television, speaker device, etc. In some instances, multimodal computing devices can enable a user to provide multiple types of input to communicate with the computing device architecture 900. The communications interface 940 can generally govern and manage the user input and computing device output. There is no restriction on operating on any particular hardware arrangement and therefore the basic features here may easily be substituted for improved hardware or firmware arrangements as they are developed.

Storage device 930 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 925, read only memory (ROM) 920, and hybrids thereof. The storage device 930 can include services 932, 934, 936 for controlling the processor 910. Other hardware or software modules are contemplated. The storage device 930 can be connected to the computing device connection 905. In one aspect, a hardware module that performs a particular function can include the software component stored in a computer-readable medium in connection with the necessary hardware components, such as the processor 910, connection 905, output device 935, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. A method comprising:
receiving, at a first routing device, a first notification from a map server, the first notification indicating a change in a policy for Locator/ID Separation Protocol (LISP) protocol based communication between at least a first endpoint device and at least a second endpoint device, the first endpoint device being connected to a network fabric through the first routing device and the second endpoint device being connected to the network fabric through a second routing device;
determining whether one or more entries of a first map cache implemented in the first routing device are affected by the change in the policy, wherein the one or more entries of the first map cache comprise mapping information received from the map server; and
forwarding a second notification to the second routing device if the one or more entries of the first map cache are affected by the change in the policy, the second notification indicating a set of one or more endpoints connected to the second routing device that are affected by the change in the policy.

2. The method of claim 1, further comprising:
upon forwarding the second notification to the second routing device, modifying or deleting the one or more entries of the first map cache if the one or more entries of the first map cache are affected by the change in the policy.

3. The method of claim 1, wherein the second notification further comprises an instruction for the second routing device to delete mappings comprising the set of one or more endpoints in a second map cache implemented by the second routing device.

4. The method of claim 1, wherein the mapping information received from the map server comprises at least a first map reply received from the map server in response to a first map request sent to the map server from the first routing device, the first map request being based on a first request received by the first routing device for the first endpoint device to communicate with the second endpoint device.

5. The method of claim 4, wherein the first map reply received from the map server is based on a first map policy, wherein the first map policy is modified to a second map policy based on the change in the policy.

6. The method of claim 5, further comprising:
receiving the second map policy from the map server in response to a second map request from the first routing device, the second map request based on a second request received by the first routing device for the first endpoint device to communicate with the second endpoint device; and
updating the first map cache with the second map policy.

7. The method of claim 1, wherein the first endpoint device and the second endpoint device belong to a common site, the common site implementing a common virtual route forwarding (VRF) network, with instance identifiers (IIDs) of all endpoint devices in the common VRF network being the same.

8. The method of claim 1, wherein the first endpoint device belongs to a first virtual route forwarding (VRF) network having a first instance identifier (IID) and the second endpoint device belongs to a second VRF network having a second instance identifier (IID), the first and second VRF networks belonging to an Extranet shared service.

9. A system, comprising:
one or more processors; and
a non-transitory computer-readable storage medium containing instructions which, when executed on the one or more processors, cause the one or more processors to perform operations including:
receiving, at a first routing device, a first notification from a map server, the first notification indicating a change in a policy for Locator/ID Separation Protocol (LISP) protocol based communication between at least a first endpoint device and at least a second endpoint device, the first endpoint device being connected to a network fabric through the first routing device and the second endpoint device being connected to the network fabric through a second routing device;
determining whether one or more entries of a first map cache implemented in the first routing device are affected by the change in the policy, wherein the one or more entries of the first map cache comprise mapping information received from the map server; and
forwarding a second notification to the second routing device if the one or more entries of the first map cache are affected by the change in the policy, the second notification indicating a set of one or more endpoints connected to the second routing device that are affected by the change in the policy.

10. The system of claim 9, wherein the operations further comprise:
upon forwarding the second notification to the second routing device, modifying or deleting the one or more entries of the first map cache if the one or more entries of the first map cache are affected by the change in the policy.

11. The system of claim 9, wherein the second notification further comprises an instruction for the second routing device to delete mappings comprising the set of one or more endpoints in a second map cache implemented by the second routing device.

12. The system of claim 9, wherein the mapping information received from the map server comprises at least a first map reply received from the map server in response to a first map request sent to the map server from the first routing device, the first map request based on a first request received by the first routing device for the first endpoint device to communicate with the second endpoint device.

13. The system of claim 12, wherein the first map reply received from the map server is based on a first map policy, wherein the first map policy is modified to a second map policy based on the change in the policy.

14. The system of claim 13, wherein the operations further comprise:
receiving the second map policy from the map server in response to a second map request from the first routing device, the second map request based on a second request received by the first routing device for the first endpoint device to communicate with the second endpoint device; and
updating the first map cache with the second map policy.

15. The system of claim 9, wherein the first endpoint device and the second endpoint device belong to a common site, the common site implementing a common virtual route forwarding (VRF) network, with instance identifiers (IIDs) of all endpoint devices in the common VRF network being the same.

16. The system of claim 9, wherein the first endpoint device belongs to a first virtual route forwarding (VRF) network having a first instance identifier (IID) and the second endpoint device belongs to a second VRF network having a second instance identifier (IID), the first and second VRF networks belonging to an Extranet shared service.

17. A non-transitory machine-readable storage medium, including instructions configured to cause a data processing apparatus to perform operations including:
receiving, at a first routing device, a first notification from a map server, the first notification indicating a change in a policy for Locator/ID Separation Protocol (LISP) protocol based communication between at least a first endpoint device and at least a second endpoint device, the first endpoint device being connected to a network fabric through the first routing device and the second endpoint device being connected to the network fabric through a second routing device;
determining whether one or more entries of a first map cache implemented in the first routing device are affected by the change in the policy, wherein the one or more entries of the first map cache comprise mapping information received from the map server; and
forwarding a second notification to the second routing device if the one or more entries of the first map cache are affected by the change in the policy, the second notification indicating a set of one or more endpoints connected to the second routing device that are affected by the change in the policy.

18. The non-transitory machine-readable storage medium of claim 17, wherein the operations further comprise:
upon forwarding the second notification to the second routing device, modifying or deleting the one or more entries of the first map cache if the one or more entries of the first map cache are affected by the change in the policy.

19. The non-transitory machine-readable storage medium of claim 17, wherein the second notification further comprises an instruction for the second routing device to delete mappings comprising the set of one or more endpoints in a second map cache implemented by the second routing device.

20. The non-transitory machine-readable storage medium of claim 19, wherein the mapping information received from the map server comprises at least a first map reply received from the map server in response to a first map request sent to the map server from the first routing device, the first map request based on a first request received by the first routing device for the first endpoint device to communicate with the second endpoint device.

\* \* \* \* \*